United States Patent
Pouillon

[11] 3,759,385
[45] Sept. 18, 1973

[54] METHOD AND APPARATUS FOR SEPARATING MIXTURES OF FINE GRAIN MATERIALS

[75] Inventor: Emile R. J. Pouillon, Bruxelles, Belgium

[73] Assignee: Societe Anonyme Cribla, Brussel, Belgium

[22] Filed: June 17, 1970

[21] Appl. No.: 46,931

[30] Foreign Application Priority Data
June 18, 1969 Netherlands........................ 6909273

[52] U.S. Cl................................. 209/165, 209/168
[51] Int. Cl............................................... B03d 1/14
[58] Field of Search............ 209/168, 170, 162–165, 209/211, 155, 173

[56] References Cited
UNITED STATES PATENTS

| | | | |
|---|---|---|---|
| 2,543,689 | 2/1951 | Driessen et al. | 209/172.5 |
| 2,726,766 | 12/1955 | Rakowsky | 209/211 |
| 2,778,499 | 1/1957 | Chamberlain et al. | 209/170 X |
| 2,843,265 | 7/1958 | Rakowsky | 209/211 X |
| 2,879,889 | 3/1959 | Rakowsky | 209/173 |
| 2,999,593 | 9/1961 | Stern | 209/144 |
| 3,219,186 | 11/1965 | Polhemus et al. | 209/211 X |
| 3,477,569 | 11/1969 | Klein et al. | 209/144 |

FOREIGN PATENTS OR APPLICATIONS

| | | | |
|---|---|---|---|
| 1,022,375 | 3/1953 | France | 209/211 |
| 1,158,461 | 12/1963 | Germany | 209/168 |

*Primary Examiner*—Frank W. Lutter
*Assistant Examiner*—Ralph J. Hill
*Attorney*—Snyder and Butrum

[57] ABSTRACT

Installation for separating a mixture of particles of two different materials, one of which materials has an affinity for a gas into fractions in which with a cylindrical tank in one wall having a centrally positioned inlet stub for a mixture of the materials for separation, in the other end wall of the tank a centrally disposed outlet for part of the liquid together with one fraction of the mixture, a tangential liquid inlet stub near the central inlet stub and a tangential outlet stub near the other end wall thereof, said outlet stub adapted for discharging the part of the liquid together with the other fraction of the mixture and there being means for commingling the gas with the liquid introduced.

1 Claim, No Drawings

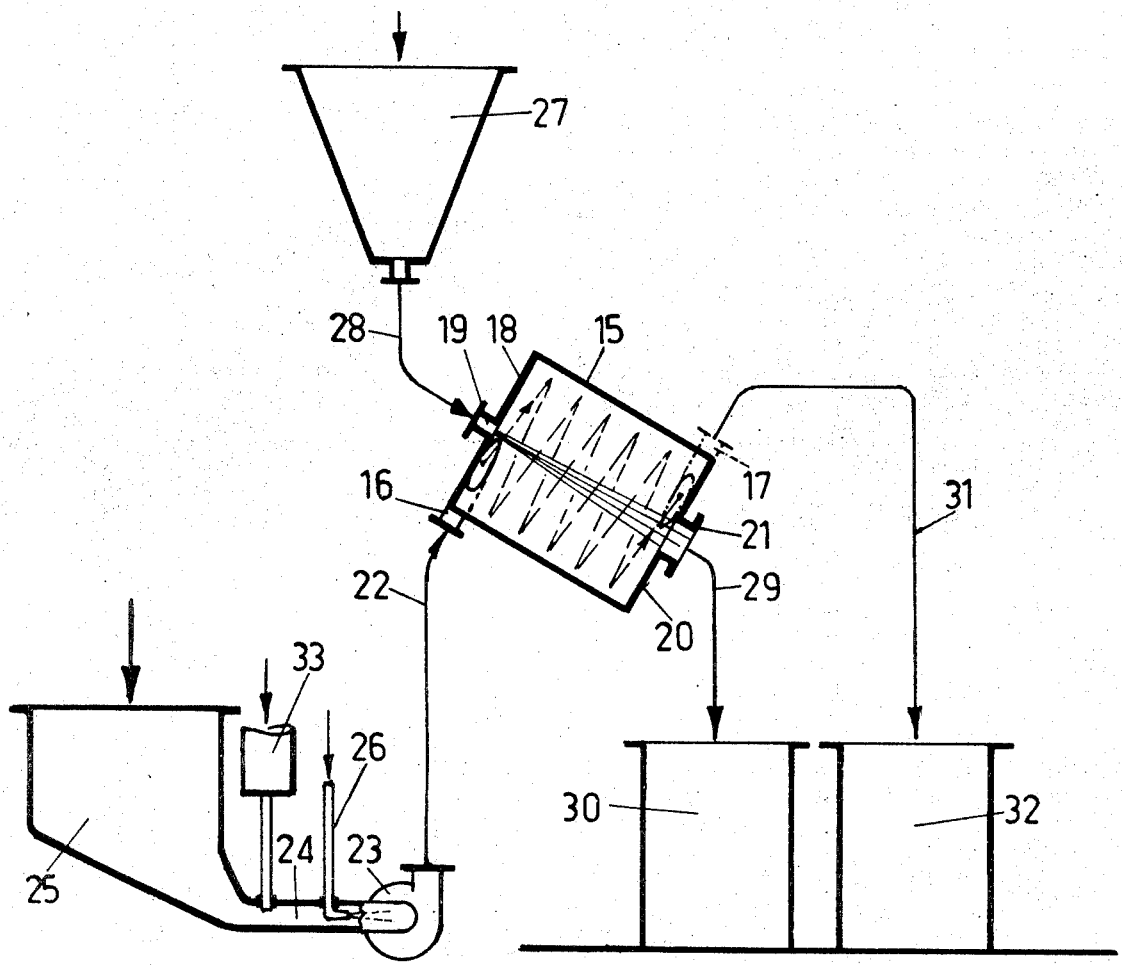

PATENTED SEP 18 1973
3,759,385
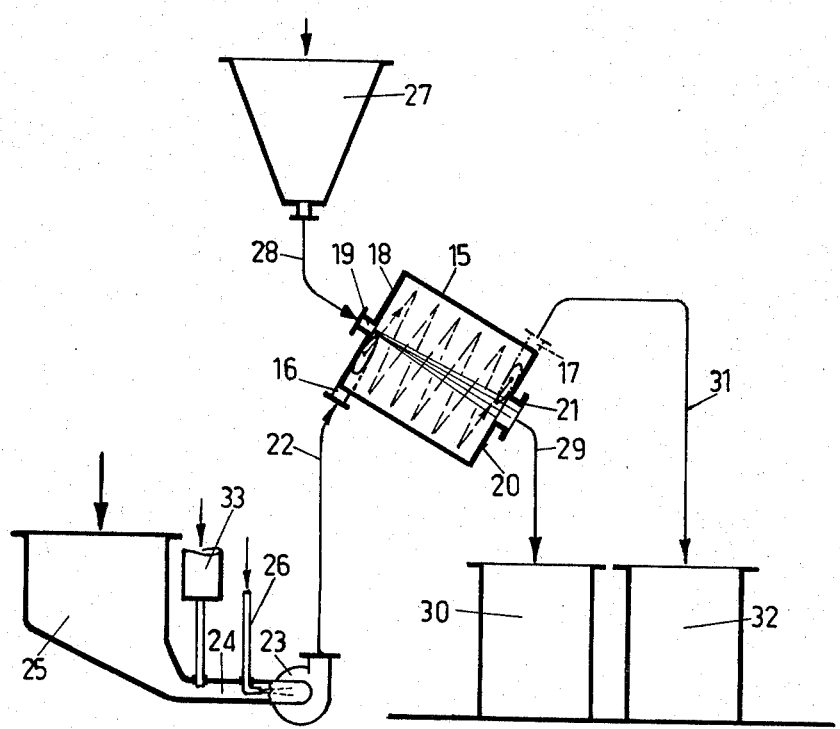
INVENTOR
EMILE R. J. POUILLON
BY Snyder and Butrum
ATTORNEY

METHOD AND APPARATUS FOR SEPARATING MIXTURES OF FINE GRAIN MATERIALS

The invention relates to a method of separating a mixture of particles of two different materials on the basis of a difference in affinity of the two materials for a gas, by means of a liquid which is brought into rapid rotation, the gas being dispersed in the liquid. Under the influence of the field of centrifugal force occuring in the rotating liquid, two zones form therein, one of which contains a heavy fraction of the mixture for separation while the other zone contains a light fraction of the mixture.

As a result of the presence of the finely divided gas in the liquid, good separation into the two fractions of the fine-grain materials is obtained.

The object of the invention is to provide a method which gives very sharp separation of the two fractions. According to the invention the mixture of particles of materials for separation can be fed in a direction axially of the resulting eddy through the rotation gas-liquid dispersion.

The invention also relates to an installation for separating a mixture of particles of materials of different types into fractions by the method described above. According to the invention, a cylindrical tank is provided, one end wall of which has a centrally positioned inlet stub, to which means are connected for supplying a mixture of the materials for separation, the other end wall of the tank having a centrally disposed outlet connected to means for discharging part of the liquid together with one fraction of the mixture, a liquid inlet stub connected tangentially to the perpheral wall of the tank is disposed near the central inlet stub and a tangential outlet stub is connected to the perpheral wall of the tank near the other end wall thereof, the outlet stub being connected to the means for discharging the part of the liquid together with the other fraction of the mixture. With such a construction of the installation, the mixture for separating must move axially through the rotating liquid.

In a very simple embodiment of the installation according to the invention, the means for supplying the gas-liquid dispersion may comprise a pump, whose inlet is provided with means for supplying gas to the liquid. Since the gas and the liquid flow through the pump together, good dispersion of the gas in the liquid is obtained in the pump. Thus no extra mixer is required.

The invention will be explained in detail in the following description of one exemplified embodiment with reference to the drawing which diagrammatically illustrates an installation according to the invention.

The installation comprises a cylindrical tank 15 provided with a tangential inlet stub 16 leading into the peripheral wall of the tank and disposed near one end thereof, while a tangential outlet stub 17 is disposed near the other end of said tank. A central inlet stub 19 is situated in the end wall 18 near the inlet stub 16 while a central outlet stub 21 is situated in the other end wall 20. Inlet stub 16 is connected via a pipe 22 to the delivery of a pump 23. aA pipe 24 connects the intake of the pump 23 to reservoir 25. The latter may contain the liquid, e.g. water, which is to be supplied to the tank 15. A pipe 26 also leads into the intake pipe 24 and air can be drawn in through said pipe 26. A container 27 for the materials which are to be separated, is connected to the inlet stub 19 via a pipe 28. Outlet stub 21 is connected via a pipe 29 to a tank 30 to receive the light fraction formed by those constituents of the mixture to which the air has adhered, together with a part of the liquid. The outlet stub 17 is connected via a pipe 31 to a tank 32 to receive another part of the liquid together with the other fraction.

The installation operates as follows. The water, together with the air drawn in via pipe 26, is fed from the tank 25 to the pump 23, the air and the liquid being intimately mixed. The resulting dispersion is fed via the pipe 22 to the tank 15. As a result of the axial introduction the dispersion receives a rapid rotation in these conditions. The mixture for separation is supplied centrally via the pipe 28. This mixture moves through the tank 15 axially with respect to the direction of movement of the rotating liquid. The heavy fraction moves outwards and is discharged via stub 17 and pipe 31 to tank 32. Part of the liquid together with the light fraction enters the tank 30 via the stub 21 and pipe 29.

As a result of the addition of air to the liquid, causing finely divided air to be present in the liquid, very good separation is obtained. Since the material particles have to move axially through the rotating liquid, all the particles come into contact with air particles which can adhere to certain material particles, so that very good separation is obtained.

It should also be noted that in the case of a mixture of particles of different specific gravity, the particles having the greater specific gravity can subsequently form the lighter fraction in the liquid gas dispersion because the gas bubbles have a greater affinity for these particles than for the particles which of themselves are of lighter specific gravity.

I claim:

1. A method of separating a mixture of particles of two different materials, only one of which materials has an affinity for a gas, which comprises the steps of:
   a. feeding the mixture into one end of an elongate chamber in axial direction;
   b. tangentially introducing liquid into said one end of the chamber;
   c. tangentially withdrawing liquid and material particles from the other end of said chamber;
   d. axially withdrawing liquid and material particles from said other end of said chamber; and
   e. during step (b), commingling said gas with the liquid introduced so that the material particles withdrawn in step (d) are of said one material and the material particles withdrawn in step (c) are of the other material.

* * * * *